(No Model.)
N. F. HARRIS.
NECK YOKE CENTER.
No. 533,889.        Patented Feb. 12, 1895.
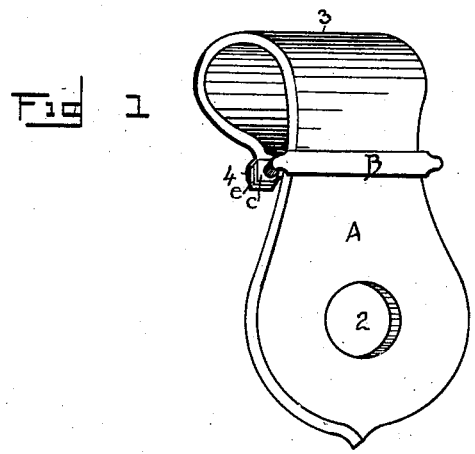
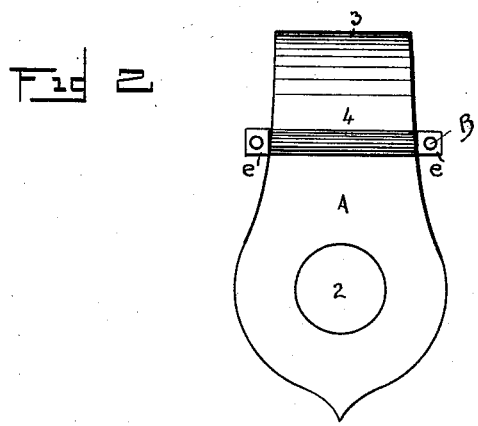
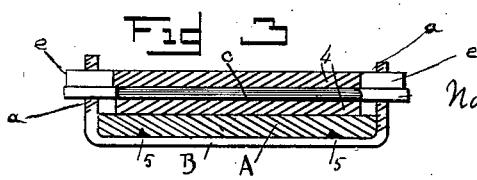
WITNESSES:
A. W. Pennock
L. D. Erion
INVENTOR
Nathaniel F. Harris
BY C. M. Sues.
ATTORNEY.

UNITED STATES PATENT OFFICE.

NATHANIEL F. HARRIS, OF OMAHA, NEBRASKA.

NECK-YOKE CENTER.

SPECIFICATION forming part of Letters Patent No. 533,889, dated February 12, 1895.

Application filed November 21, 1894. Serial No. 529,545. (No model.)

*To all whom it may concern:*

Be it known that I, NATHANIEL F. HARRIS, residing at Omaha, in the county of Douglas and State of Nebraska, have invented certain useful Improvements in Neck-Yoke Centers; and I do hereby declare that the following is a full, clear, and exact description thereof, such as will enable others skilled in the art to which it appertains to make and use the same, reference being had to the accompanying drawings, which form a part of this specification.

This invention has relation to a novel improvement in neck yoke centers, the object of my invention being to provide a neck yoke center that shall be adjustable to different sized neck yokes and that shall embody a locking device preventing the unlocking of the center after it has once been adjusted, making my improved neck yoke adjustment positively actuated.

In the accompanying drawings, Figure 1 shows a perspective view of a neck yoke center embodying my invention. Fig. 2 is a bottom view thereof, while Fig. 3 shows a side elevation of the locking clip and bar as used in my device.

In the fulfillment of the object of my invention, which is to provide an adjustable but positive locking neck yoke center, I construct a center, A, of any suitable design, size and material, though preferably of leather, which comprises the elongated blank, A, provided with the tongue opening, 2, and the extending portion, 3, which is re-curved to form the neck-yoke supporting loop, and terminates in a terminal loop, 4, which loop is adapted to encompass and movably hold a clamping bar, c, a side elevation of which bar is shown in Fig. 3. This bar comprises, essentially, a rounded central portion ending in two terminal eyes, which eyes are adapted to work over and contain the threaded stems, a, a, of the clip, B, as is more clearly shown in Fig. 1. This bar, c, is sewed or otherwise secured within the end, 3, of the center, while the approximately U-shaped clip, B, is adapted to stride and work over the neck portion of the center, as is shown in Fig. 3. This clip, B, may be made of any suitable size, shape or material, but is preferably made of metal, and is provided with one or more inwardly extending pointed nibs, 5, 5, as shown in Fig. 3.

This clip, B, can be made of rounded iron, having its two terminations threaded, while the center is preferably flattened so that it will present a flat riding surface, the nibs, 5, forming an integral part thereof and being upset during the same operation that the bar is centrally flattened. The stems, a, a, of the clip are provided with suitable nuts, e.

In assembling my improved neck yoke center, the bar, c, having been previously secured within the upper end thereof, the clip is made to encompass the center from above, striding the neck portion, while the threaded stems, a, a, are passed through the eye openings of the bar, c. The nuts, e, e, are then fixed and adjusted until they thread themselves down upon the bar. It should be stated here that the bar, c, is adjusted in length so that when the nuts, e, e, are adjusted they fit snugly against the sides of the terminal loop of the center, so that as these nuts are tightened they have to successively press the leather aside until they find a seating upon the eyes of the bar, c, as will be noticed in referring to Fig. 3, where the re-curved neck portion, 4, is shown as locking the nuts, e, to the threaded stems, a, a.

It is of course understood by those familiar with the art, that these neck yoke centers are being continually agitated, so that anything that is secured by nuts would be likely to, in the course of time, unlock. This is a very important feature of my invention, as it absolutely prevents the unlocking of these adjusting nuts and so makes the device positively actuated.

As illustrated, I have shown the bar, c, as passing through the terminal loop of the center, but it is of course understood that the clip, B, could be made to pass through this terminating loop, 4, and be clamped upon the outside to the bar, c, and the bar, c, be provided with the impinging nibs, 5, thereby reversing the clip. So, also, could the bar, B, and the stems, a, be separate, the bar, B, and bar, c, being clamped together by bolts passing through the eyes in the bar, c, and threading in the ends of the bar, B, being adjustably secured thereto. This binding clip can, of course, be unlocked in forcing the nuts in the opposite direction which of course gradually forces the leather out, which, to a great degree is pliable, so that the adjustment can be imparted to the center. So, also, it will be noticed that the bar, c, being round, adjusts itself within the terminal loop of the center, so that the flat side of the eye of the bar, c, the nuts, e, e, and the binding surface of the clip, B, are always in the same plane and so snugly register.

Now, having thus described my said invention, what I claim as new, and desire to secure by United States Letters Patent, is—

In an adjustable neck yoke center, the combination, with a bar revolubly held within the terminal loop of said neck yoke center, said bar being provided with two terminal eyes, of a striding binding clip riding over said neck yoke center and being adapted to engage said revolubly held bar, the terminal stems of said clip being threaded and at an angle to the body of said clip, and being adapted to extend through said terminal eyes, said clip being provided with one or more impinging nibs adapted to embed within said center, and nuts adapted to thread upon said terminal stems and lock upon said revolubly held bar and against said terminal loop, to positively lock said nuts, all substantially as and for the purpose set forth.

In testimony whereof I affix my signature in presence of two witnesses.

NATHANIEL F. HARRIS.

Witnesses:
 G. W. SUES,
 W. M. COWHERD.